United States Patent
Graber et al.

(10) Patent No.: US 11,784,985 B2
(45) Date of Patent: Oct. 10, 2023

(54) NETWORK SECURITY DEVICES AND METHOD

(71) Applicant: Wattre, Inc., Woodburn, IN (US)

(72) Inventors: Curtis E. Graber, Woodburn, IN (US); Jerry Wickey, Jr., Fort Wayne, IN (US); Barry A. Richhart, New Haven, IN (US)

(73) Assignee: Wattre, Inc., Woodburn, IN (US)

( * ) Notice: Subject to any disclaimer, the term of this patent is extended or adjusted under 35 U.S.C. 154(b) by 175 days.

(21) Appl. No.: 17/499,101

(22) Filed: Oct. 12, 2021

(65) Prior Publication Data

US 2022/0038438 A1    Feb. 3, 2022

Related U.S. Application Data

(62) Division of application No. 15/977,585, filed on May 11, 2018, now Pat. No. 11,153,283.

(60) Provisional application No. 62/505,425, filed on May 12, 2017.

(51) Int. Cl.
  *H04L 9/40* (2022.01)
  *H04L 9/08* (2006.01)
  *H04L 9/00* (2022.01)
  *H04L 9/06* (2006.01)

(52) U.S. Cl.
  CPC ......... *H04L 63/0428* (2013.01); *H04L 9/003* (2013.01); *H04L 9/0631* (2013.01); *H04L 9/0662* (2013.01); *H04L 9/0838* (2013.01); *H04L 9/0861* (2013.01); *H04L 9/0891* (2013.01); *H04L 63/068* (2013.01)

(58) Field of Classification Search
  None
  See application file for complete search history.

(56) References Cited

U.S. PATENT DOCUMENTS

| | | |
|---|---|---|
| 9,942,211 B1 | 4/2018 | Campagna |
| 2004/0228492 A1 | 11/2004 | Park |
| 2007/0076886 A1 | 4/2007 | Hori et al. |
| 2017/0034131 A1 | 2/2017 | Yotov et al. |

OTHER PUBLICATIONS

Suneetha Thaduri * et al., 2017, (IJITR) International Journal of Innovative Technology and Research vol. No. 5, Issue No. 5, Aug.-Sep. 2017, 7328-7331. (Year: 2017).*
Nipane, S., Bhiogade, V., Wanve, E. and Dudhbure, O., 2017. A Survey on Identity Based Encryption in Cloud Computing, International Research Journal of Engineering and Technology (IRJET), vol. 04 Issue: 01, pp. 505-509 (Year: 2017).*

(Continued)

Primary Examiner — Luu T Pham
Assistant Examiner — Edward X Long
(74) Attorney, Agent, or Firm — Taylor IP, P.C.

(57) ABSTRACT

An encryption/decryption method including the steps of encrypting a message, beginning with the encrypting of the message using a key and a salt, the salt being a random number; stopping the encrypting step when the message is encrypted resulting in an encrypted message; encrypting the salt with the key resulting in an encrypted salt; and assembling the encrypted salt, a demark character, the encrypted message and padding to form a data set.

10 Claims, 5 Drawing Sheets

(56) References Cited

OTHER PUBLICATIONS

Vidgren et al., Security Threats in ZigBee Enabled Systems: Vulnerability Evaluation, Practical Experiments, Countermeasures, and Lessons Learned, 2013 46th Hawaii International Conference on System Sciences, pp. 5132-5138. (Year: 2013).

Agrawal et al., Order Preserving Encryption for Numeric Data, SIGMOD 2004, Paris, France, pp. 1-12 (Year: 2004).

* cited by examiner

NETWORK SECURITY DEVICES AND METHOD

CROSS REFERENCE TO RELATED APPLICATIONS

This is a divisional application based upon U.S. patent application Ser. No. 15/977,585, entitled "NETWORK SECURITY DEVICES AND METHOD" filed May 11, 2018, which is incorporated herein by reference. U.S. patent application Ser. No. 15/977,585 is a non-provisional application based upon U.S. provisional patent application Ser. No. 62/505,425, entitled "NETWORK SECURITY DEVICES AND METHOD", filed May 12, 2017.

BACKGROUND OF THE INVENTION

1. Field of the Invention

The present invention relates to a computational implemented device and method for cryptography for the encryption of digital information.

2. Description of the Related Art

Since 2005 there have been dozens of publically documented successful hacks, which illustrate the vulnerability of the Advanced Encryption Standard (AES) 256 bit (AES 256) and other software only encryption tools. AES is based on a design principle known as a substitution-permutation network, which is a combination of both substitution and permutation encryption techniques. AES can have a key size of 256 bits, hence AES 256.

It is likely that top enemy states already have the ability to override current encryption protocols if and when they gain access to a network. This means that nefarious forces can shut down or foul the systems of vessels, networks, weapon systems, etc. using software encryption protocols which are already proving to be publically hacked on a regular basis.

Here is a Partial List of published successful AES attacks:
2002, Nicolas Courtois and Josef Pieprzyk
2005, D. J. Bernstein
2005, Dag Arne Osvik, Adi Shamir and Eran Tromer
2009, Alex Biryukov, Dmitry Khovratovich, & Ivica Nikolie
2009, Bruce Schneier
2009, Alex Biryukov, Orr Dunkelman, Nathan Keller, Dmitry Khovratovich, and Adi Shamir
2009, Super-Sbox
2010, Vincent Rijmen
2010, Endre Bangerter, David Gullasch and Stephan Krenn
2011, Andrey Bogdanov, Dmitry Khovratovich, & Christian Rechberger
2016, Ashokkumar C., Ravi Prakash Giri and Bernard Menezes There are a myriad of problems with software-only solutions. For example, a pump controller on a 1970s era sea going vessel will not be able to use a high level of encryption due to a lack of storage and computing power. Typically any system that is ten or more years old will have difficulty or even not be able to work with software-only solutions.

"Software-only" solutions have a vulnerability to inside intrusion and side channel attacks. What is needed in the art is a hardware/software approach to encrypt/decrypt information that is effective and virtually transparent to the computer or network member that share information.

SUMMARY OF THE INVENTION

The present invention provides a terminator module solution, includes:
A Smart Terminator Module—Fixed Unhackable Cable Key.
Multiple Form factors available—including Cable Extension Network Interface.
Unhackable network security with monitoring, active security measures and logging features.
Any and all hacking efforts are discovered, logged and neutralized.
"Diamond" in that any safe information/light that needs to pass through can, but the encryption/"Lock" blocks all potential threat, by the use of a SEAS—Symmetric Encryption-Asymmetric Solution (SEAS).

The present invention in one form is an encryption/decryption method including the steps of: encrypting a message, beginning with the encrypting of the message using a key and a salt, the salt being a random number; stopping the encrypting step when the message is encrypted resulting in an encrypted message; encrypting the salt with the key resulting in an encrypted salt; and assembling the encrypted salt, a demark character, the encrypted message and padding to form a data set.

The present invention in another for is an encryption method comprising the steps of: encrypting a message using a key altered by salt, the salt being a random number padding, this step resulting in an encrypted message; encrypting the salt using the key, this step resulting in an encrypted salt; and assembling the encrypted message and the encrypted salt into a data set.

The present invention in yet another form is a data communication encrypted system including a first module coupled to a first network member and a second module coupled to a second network member. The first module and the second module are in communication with each other thereby allowing communication between the first network member and the second network member. The first module and the second module each operating with a key hopping encryption/decryption method that changes key sets at irregular intervals of time as determined by the modules.

The present invention advantageously is effectively transparent to the elements of the network.

Another advantage of the present invention is that one key of a key set is used to exclusively encrypt a subsequent key set.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
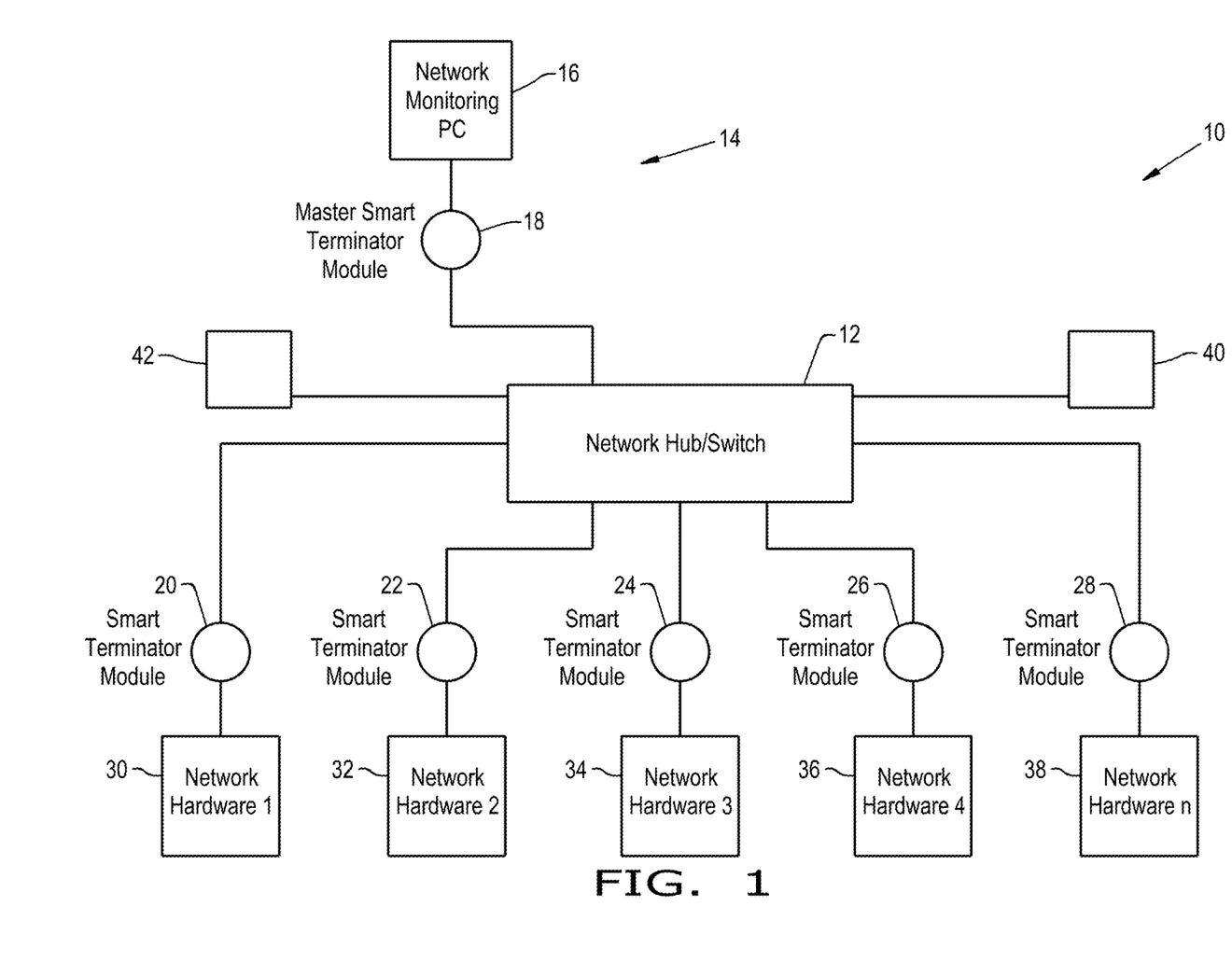
FIG. 1 is a block diagram depicting the positioning of embodiments of smart terminator modules of the present invention.

Referring now to the drawings, and more particularly to FIG. 1, there is shown a secured network 10, having a network hub/switch 12, a secure station 14 having a computer (PC) 16, and a terminator module 18, terminator modules 20, 22, 24, 26 and 28, are respectively plugged into hardware 30, 32, 34, 36 and 38. Hardware 30, 32, 34, 36 and 38 are representative of systems, computers, or other hardware, which can be referred to as network members, which are now coupled to network 12 by way of modules 20, 22, 24, 26 and 28.

Among the benefits of the present invention are the key advantages of a physical item plugged in at every node, which allows state of the art encryption on any kind of system, for example an existing system, such as a Naval vessel of any age; even networks and devices on 1970s era ships can be protected with a device 18, 20, 22, 24, 26 or 28 that takes seconds to just plug into devices 16, 30, 32, 34, 36, 38.

When networked hardware 10 is physically and virtually locked with a Diamond Lock Symmetric Encryption Asymmetric Solution (SEAS) terminator module 18, 20, 22, 24, 26, 28, the following attributes of the present invention are implemented:

I. Ease of Implementation & Usability
1. No alteration to current system, other than a simple installation, which is then transparent to PC 16, network 12, and hardware 30, 32, 345, 36, and 38.
   a. Current AES 256 encryption and/or all other software systems can remain in place.
   b. No new software needs to be installed on the network members, and no modifications are needed to any existing software on network 10.
2. Installation is literally "plug and play" simple, with only seconds needed to install at each node, with modules 18, 20, 22, 24, 26, 28, being plugged in, for example with Ethernet connectors.
3. Some existing outdated hardware (say for example hardware 30 is a pump controller) could not otherwise be updated with protection other than by way of the present invention.
4. There are network devices on every ship that are NOT compatible to 8000 bit security and likely on every land, air or space based system.
   a. Equipment, which was once not backwards compatible can now be bridged to a new dimension of security
   b. There is no need to require vendors to develop, create and sell any new devices.
5. A single entity can install the present invention modules 18, 20, 22, 24, 26, 28.
6. The present invention can be installed "on top" of any existing network encryption in real time, without shutting down system 10.
   a. Operates invisibly, forever
7. The encryption algorithm of the present invention works more than five times faster than any existing encryption algorithm.
8. Flexible form factor of terminator module allows it to fit any and all environments.

II. Cost Neutral—Cost Savings
1. Advantageously the present invention eliminates delays and costs in coordinating multitudes of vendors (software/hardware) aligned around a new security protocol.
2. There is no need for upgrading any current hardware or software.
3. Less expensive than any possible software implementation because new software would require installation and testing on every computer and device on the network,
   With prior art systems there are likely some outdated devices which would not be capable of handling a particular software solution.
   Also with prior art systems there was also an issue of using new software that would not be backwards compatible.
4. Speed and ease of installation of the present invention is as fast and simple as plugging in a network cable.

Figure 2:
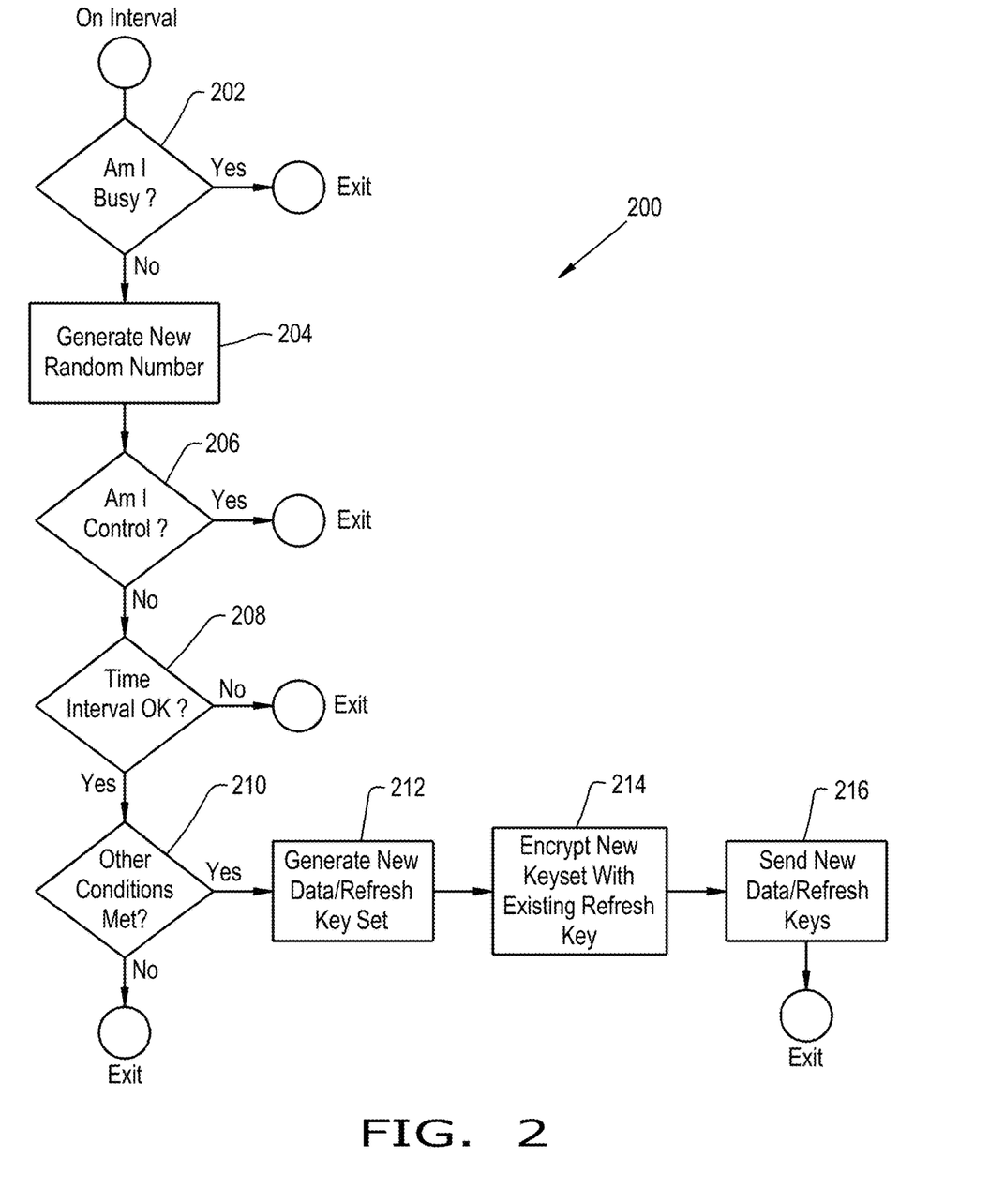
FIG. 2 is a flowchart depicting a method of key generation of the modules of FIG. 1.
Figure 3:
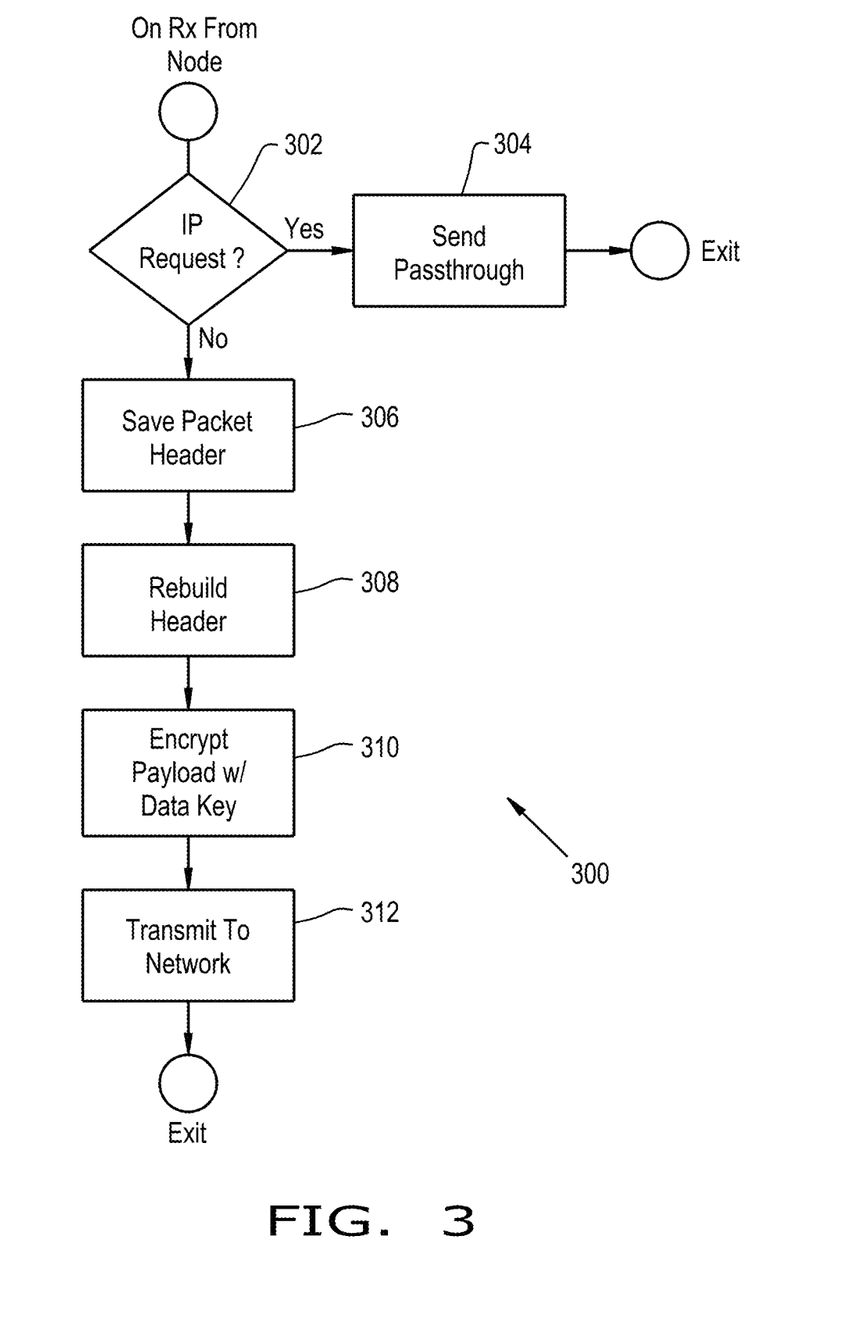
FIG. 3 is a flowchart depicting a method of encrypting a payload in the modules of FIG. 1.
Figure 4:
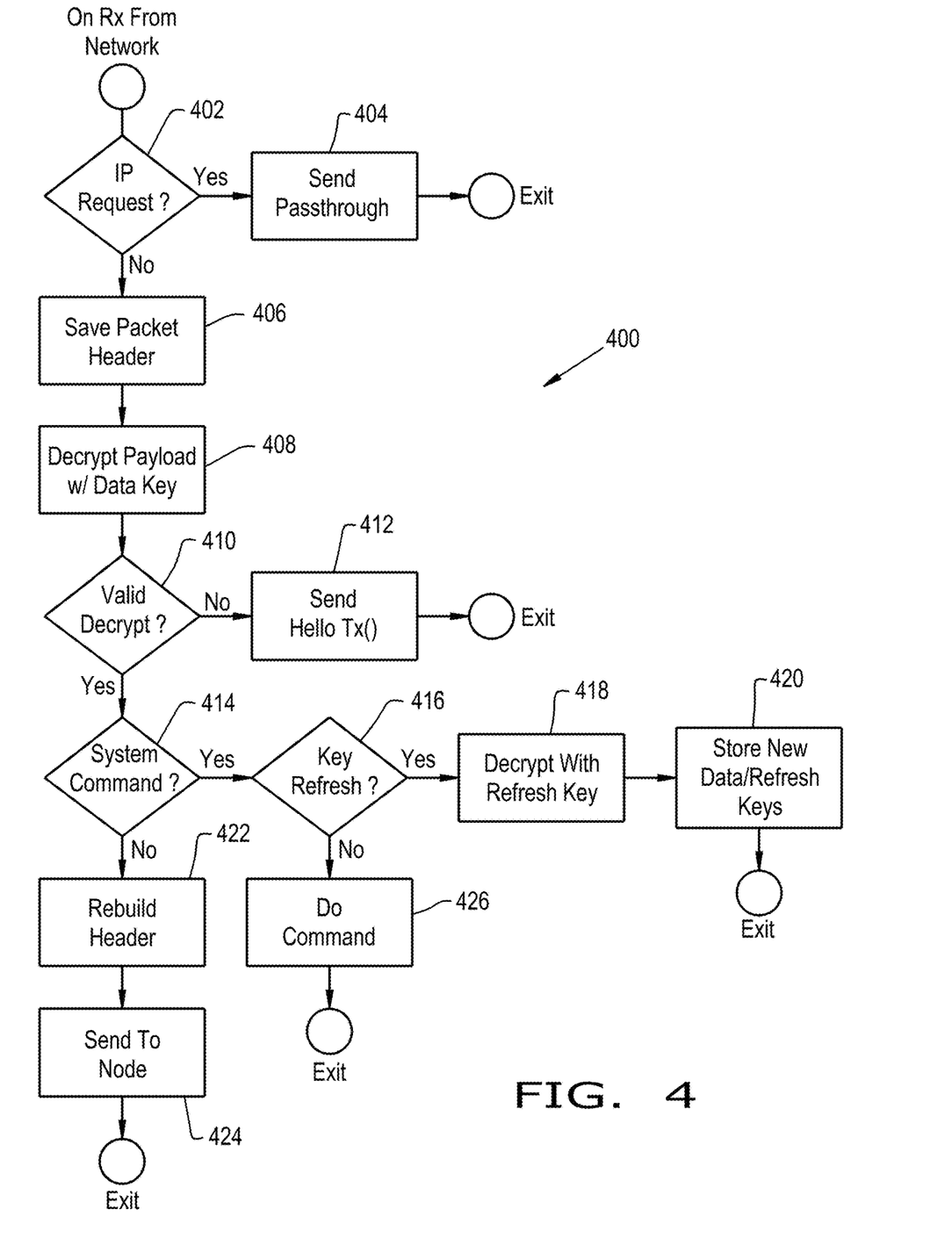
FIG. 4 is a flowchart depicting a method of decrypting information received by a module of FIG. 1.

III. Security Enhancement
1. With the present invention no one will know how to discover the key as they do now.
   People using network 10 can't discover the signature key, thus they are unable to share the key with threats.
   Even the manufacturer of modules 18, 20, 22, 24, 26 and 28 are not even be able to discover the key.
2. Misplaced or stolen raw hardware is never a threat.
3. While some communication systems have frequency hopping capability, to provide jam resistant communications, the present invention uses an encryption key hopping method, as illustrated in FIGS. 2-4.
   The key hopping can have ANY timed hopping interval. Password can change as frequently as needed.
4. Can use a much higher bit strength (while no limit is contemplated, it can use, for example, up to 8000 vs. 256 key strength) thus a much higher level of encryption.
5. Employs key salt and message padding.
6. Innate ability to defend against Denial of Service Attacks (DSA) from any network device secured on network 10.
7. Immediately exposes any DSA and neutralizes them.
8. Enemy nodes are detected and logged if they arise.
9. Everything happening is securely logged, creates an unalterable log, akin to a Black Box on an airplane.
10. Untrusted devices on the network have no ability to communicate with trusted devices (those with devices 18, 20, 22, 24, 26, 28, which have followed the protocols of FIGS. 2-4).
11. Because the present invention uses a dedicated processor that is unavailable to prying eyes, it cannot leak any data unlike current encryption systems, which effectively denies possible side channel attacks.
12. Even if the original software were published, it still will not enable an enemy to hack. They would need to also know the original signature keys, they would need the actual terminator modules 18, 20, 22, 24, 26, 28 from the correct manufacturer's lot and they would need to collude with the vessel's IT command and control, making it virtually impossible to overcome the security features of the present invention.

13. Once original pieces 18, 20, 22, 24, 26, 28 (all those needed and spares) are manufactured and have the signature keys installed, the original signature keys can be destroyed, and the lot stands alone.

14. The present invention catches equipment operating out of its profile (behavioral analytics) and shuts it off AES 256 and other systems cannot stop the actual messages being sent out.

An understanding of the security of the present invention can be gained by looking at what it would take to potentially hack the present invention.

Method 1:

At least one of the terminator module pieces 18, 20, 22, 24, 26, 28 would have to be stolen from the correct unique network signature lot prepared by the manufacturer . . .

AND . . .

. . . that terminator module would have to be physically installed into the network that is in use . . .

AND . . .

there would need to be an IT person in the control room colluding with the hacker to authorize access of the terminator module.

IT personnel cannot even steal and sell, because they never have the network signature—unlike what all other known encryption technologies are vulnerable to.

. . . BUT even if all of the above occurs, the network events are permanently recorded in an unalterable forensic log that is local and can be duplicated remotely as well.

Method 2:

Future yet to be developed Quantum computer (the theoretical concept of infinite computing capability), using Shor's Algorithm may at that point be able to discover a code but still would not yet be able to overcome the physical, key hopping and other obstacles of the present invention.

The above two methods are nearly impossible. Diamond Lock SEAS delivers a level of security that is a multitude higher than any known public or military encryption solution currently in place or proposed.

A Smart Terminator Module (STM) 18, 20, 22, 24, 26, 28 is a component of the Diamond Lock-SEAS encryption solution. The use of an STM 18, 20, 22, 24, 26, 28 provides network encryption methods, 200, 300 and 400 and processes unavailable to existing network devices. Features of using the STM 18, 20, 22, 24, 26, 28 with the Diamond Lock-SEAS encryption solution include:

Resistance to side-channel attack by storing encryption keys in tamper proof, inaccessible areas of RAM.

Faster encryption and decryption by offloading intensive processing from the limited resources of a network device 16, 30, 32, 34, 36, 38 to dedicated processors in STM 18, 20, 22, 24, 26, 28.

Random number generation is hardcoded into STM 18, 20, 22, 24, 26, 28 processors providing random keys required to create 'unbreakable' high bit count keys.

Key 'hopping' (changing high bit count keys at irregular intervals—see method 200) significantly improves resistance to key discovery and use by unauthorized users.

Reduced instruction set of the STM 18, 20, 22, 24, 26, 28 dedicated processor does not allow unauthorized code, malware, or other harmful software attacks to extract key information or other ancillary data vectors (data leakage) required to break encryption protocols.

STM 18, 20, 22, 24, 26, 28 encryption provides additional encryption 'on top of' existing network encryption schemes such as typical AES protocols.

The present invention is compatible with all existing network encryption schemes, since it operates, in a sense, apart from the reset of network 10.

Existing encryption schemes on existing networks remain in operation.

Plug-and-Play ease of installation to an existing network.

All secure network data is encrypted using dedicated STM 18, 20, 22, 24, 26, 28 protocols thereby reducing configuration hassles within a wide variety of network environments.

Secure networks established by STM 18, 20, 22, 24, 26, 28's does not affect non-secure network traffic, since traffic going through network hub 12 is unaware of the encryption. For example a hardware items 40 and 42 are coupled to network hub 12, but have no STM coupled thereto. As a result hardware item 40 can communicate with hardware item 42, but not with hardware 16, 30, 32, 34, 36, 38.

Multiple secure networks can be hosted on a single physical data network. For example, STMs 26 and 28 can be their own secure network apart from other hardware using network hub 12.

1) Key Hopping

In the prior art the industry standard practice is to often change the security key with a new randomly generated key by encrypting the new key with the key currently in use. Decrypting that key reveals the new key to only those who currently have the current key. This poses two problems. What if a device falls out of synch by missing the key change. There is no secure way to restore the device. Also, the security of the new key is compromised by the fact that it was encrypted with a key that was already used to encrypt a great deal of data. This leaks information about the key.

If a nefarious actor did find any key in this chain of keys, he can decrypt the next key change as well.

In the present invention there are two keys (Data and Refresh) instead of just one, this makes the first key set, which can be passed either by the Handshake method above or by some asymmetric encryption such as RSA or Diffie-Hellman. Communication proceeds on the first of these two keys until either part 18, 20, 22, 24, 26, 28 calls to refresh keys. At which point the two new keys are generated randomly forming the second key set, which is encrypted using the second key (Refresh) of the first key set. Once decrypted by the other party 18, 20, 22, 24, 26, 28, both keys are replaced and communication continues using the first key (Data) of each successive key set.

This provides the huge advantage of never using the second key except to encrypt the next key set. Since a key set is comprised of random characters, they cannot reveal anything about the second key or the new key set. Even if a nefarious actor were to discover the keys used to transmit data, he would lose his ability to decrypt the data at the next key set, since the second key (Refresh) was never exposed in any way.

2) Method of Random Number Generation

The quality of random numbers used in cryptography is paramount to the security of encrypted data. Industry standard practice develops and improves pseudo random number generators by quantifying the quality of many random numbers generated by a given pseudo random number generator. If the quality is insufficient, tweaks are applied to the generator and it is retested.

The industry recognizes that the number of unique states in which industry standard pseudo random number generators can seed are in some cases as small as 2 to the power of 32. This is grossly inadequate for robust encryption.

The present invention provides a novel, as yet undiscovered solution, innovation or improvement: During the process of developing each random number, byte by byte, the nascent number is tested for entropy and altered to introduce more entropy if necessary.

As each byte of the nascent random number is generated by methods such as bit rotate, shift, XOR, and AND, the entropy of the new byte is measured by counting the number of times that byte value has already appeared in the nascent random number. If it occurs more than the number of bytes in the nascent number divided by the number of available characters for that byte, the byte value is replaced by the next available and valid value or dropped merely entirely. See pseudo code below. newRandomNumber( )

3) Signature Key Handshake

Industry standard practice is to manually enter network security keys into devices connecting to a network. In the prior art most network devices simply don't have the computing power to pass randomly generated symmetric keys with a public asymmetric key.

The present invention provides a novel, as yet undiscovered solution, innovation or improvement: All devices which are intended to work together are given the same random signature key at the time of manufacture or flashed with the same signature key at some point before implementation.

One device 18, 20, 22, 24, 26, 28 can announce its serial number to each other in plain text. The other device encrypts a random string of characters with its signature key. When a device receives and correctly decrypts the string of random numbers and use the decrypted string as a key to encrypt a response, the two have just shared a private key, which is used for continued secure communication. See System Protocols below.

4) Unique Method of Streaming Symmetric Encryption with Salt and Padding

Looking at the prior art: Random "salt" is used to alter a symmetric key deterministically. Random "padding" is also be added to the message. In this way, the same message encrypted with the same key appears differently every time. Industry standard practice employs salt of fixed length and padding to fill messages to a predetermined length. The padding does not need encryption and the salt must be stored in a data base. The length of salt and location of padding can leak information about the key. Also, if a nefarious actor were to cause a message known to him to be encrypted, he can infer the key, because knowledge of the salt is not secured.

The present invention provides a novel, as yet undiscovered solution, innovation or improvement: The salt is the padding. Take the padding length as the number of characters to fill the desired length of the encrypted message. The system then generates a random string of characters of that length minus one. It replaces all occurrences of a designated demark character from the string and appends the demark character at the end. Further appending the message to the string.

Encryption is begun by using the key until the demark character is encountered. Then it continues encrypting using the key altered by the salt. The demark character is encrypted along with everything else and becomes hidden. The length of the salt and therefore the length of the message is also hidden. The padding is the salt.

Decryption begins by decrypting using the key only. Once the decryption reveals the demark character, the system continues decrypting by altering the key with the newly decrypted salt in the same way as encryption.

In this way the salt is secured by the key and the key is secured by the salt. The salt is unavailable. The only place it is stored is as encrypted padding in the encrypted message. Even if a known message were encrypted, the key cannot be determined by causing a known message to be encrypted. See pseudo code below. cypher( )/decipher( )

5) Method of Limiting Side Channel Information Leakage

Industry standard practice (prior art) employs a processor and memory to compute encryption which memory and processor are also available to the computer's main processor. This exposes many opportunities for harvesting data that may reveal portions or all of the key.

The present invention provides a novel, as yet undiscovered solution, innovation or improvement: The present invention solves this by employing a discrete processor and memory physically separated from any other computer. This prevents many unintentional channels of information. The only side channels that could remain are the timing of, and patterns in, the bitstream.

This last unintentional channel is addressed by buffering the encrypted bitstream through a transmit stack with its own timing algorithm.

System Protocols

Events for Smart Terminator Module (STM) hardware. These 'hardware interrupt' events trigger the execution of various commands. Pseudocode shown below represents basic logic structure for these protocols See FIGS. 2-4, methods 200, 300 and 400 and the following code:

```
onInterval( )
Am I busy? {Step 202}
    if not,
        newRandomNumber( seed) {Step 204}
        have I received command with a sender serial number higher
than mine? {Step 206}
            if so,
                I am not the controller module and remember {Step 206}
            if not,
                send to network IamCNT( ) null command {exit}
                Are conditions met? {Steps 208 and 210}
                    do controller commands KeyRefresh( ) {Step 212}
on receive packet from node {Method 300}
Is this an IP address lease request? {Step 302}
    If so
        Send packet to network as-is {Step 304}
    If not
        save packet source and destination {Step 306}
        build packet with source, destination, length of encrypted
payload, payload {Step 308}
        encrypt payload and length of payload with current data
key function cypher( ) {Step 310}
            send to network {Step 312}
on receive packet from the network {Method 400}
    Is this a response to an IP address lease request ? {Step 402}
        If so
            Send packet to node as-is {Step 404}
        If not
            save packet source and destination {Step 406}
            decrypt payload with current data key function
decypher( ) {Step 408}
            if this decryption is not valid, {Step 410}
                if not
                    send helloTx( ) {Step 412}
                if so
                    is this a STM module command? {Step 414}
```

```
        if not
            build packet with source, destination,
decrypted length payload, decrypted payload {Step 422}
                send to node {Step 424}
        if so
            do command received {Step 426}
            is the sender serial number higher than
mine?
            if so
                remember serial #
                I am not the
controlling module, I do no control functions,
            if not
                I am the controlling
module, send IamCNT( )
```

Commands Received
Commands sent from the network to the Smart Terminator Module (STM) hardware.

```
report {reporting network traffic & other stats}
    send installation specific stats to node
flash {signature keyset loading, one time only}
    if signature non-volatile memory is not null, ignore
    else store signature, first and second random number all in plaintext
IamCNT {I am in command statement to other modules}
    OnInterval
    Send serial #
off {Stop transmitting data, Part of Denial-of-Service attack defense}
    stop sending data from my node
pass Through {Backwards compatibility & Network
Maintenance option}
    pass plaintext data
keyRefreshRx {"Hop" to next key change} {Step 416}
    stop passing plaintext, pass encrypted only
    further decrypt using the current refresh key {Step 418}
    save new data key {Step 420}
    save new refresh key {Step 420}
challengeRx {
    decrypt with current key,
    Is decrypt valid?
        If not
            Decrypt with signature key
            is decrypt valid?
                If not
                    Do nothing - may be on wrong network
        Respond to challenge
respondRND {send random data - obscure true network traffic and
limit side-channel opportunities}
    send random data to network
null {do nothing}
    do nothing
helloRx {Am I the controller}
    am I the control module?
    if not, ignore
    if so, send challenge( )
```

Commands Transmitted
Commands sent from the Smart Terminator Module (STM) hardware to other devices on the network.
  Challenge {Attempt to synchronize with the network}
  Generate and save random challenge message
  Encrypt using current data key and send to network
  Queue oninterval( ) before sending challenge message using signature key
  helloTx {send serial #in plaintext to identify module to network}
   send to network, my serial number in plain text
  IamCNT {send serial #in plaintext to identify module to network}
   send to network, my serial number in plain text
  keyRefreshTx {"Hop" to next key change} {Step 212}
  newDataKey=newRandomNumber(seed) {Step 214}
  newRefreshKey=newRandomNumber(seed) {Step 214}
  send to network(cypher(encodeCommand('keyRefresh', seed+newDataKey+newRefreshKey, refresh key, seed, blockSize)) {Step 216}
  DataKey=newDataKey
  RefreshKey=newRefreshKey
Functions
function newRandomNumber($seed){
$entropy=array(0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0,
0, 0, 0, 0, 0, 0, 0, 0, 0);

```
$temp= '';
$l= strlen( $seed[0]);
for ( $i=0; $i<$l; $i++){
    $t= ord( $seed[0][ ( $i +1) %$l]);
    $t= $t ^ord( $seed[0][( $t +$i +3) %$l]);
    $t= $t ^ord( $seed[1][ $i]);
    $t= ( $t +$i +7) %256;
    $entropy[ $t]++;
    if( $entropy[ $t] > $i /256){
        $t= $t ^( 128+32+8+1);
    }
    $temp.= chr( $t);
}
$seed[0]= $temp;
return $seed;
}
function cypher( $message, $key, $salt, $block){
    // block must be at less than 3/4 the string length of salt
    // salt must contain at least two different characters
    // key must be at least one character
    // message must be less than 65k characters
    $message= $_GET['m'];
    $key= $_GET['k'];
    // find boundary markers
    $dmark= $salt[0];
    $emark= $salt[1];
    for ( $i=2; $dmark==$emark; $i++){
        $emark= $salt[0][$i];
    }
    $salt= str_replace( $dmark, $emark, $salt);
    // find lengths for salt - message - padding
    $ml= strlen( $message);
    $mlb= chr( intval( $ml /256));
    $mlb.= chr( $ml -( ord( $mlb) *256)); // message length encoded
    $tl= $block *( intval( 1.3 *$ml /$block) +1); // bytes for the number of whole blocks
    $sl= intval(( ord( $dmark) *0.75 /256 +0.20) *( $tl -$ml -6)); // random portion for salt
    if( $sl < 2) {$sl= 2; }
    $pl= $tl -$sl -$ml -4; // balance to padding minus length and dmark
    // cut and trim to size
    $pad= substr( $salt, $sl, $pl);
    $salt= $dmark .substr( $salt, 0, $sl) .$dmark;
    // bit stream cypher
    // salt
    $cypher= '';
    for( $i= 0; $i<strlen( $salt); $i++){
        $t= chr( ord( $salt[$i]) ^ord( $key[$i %strlen( $key)]));
        $cypher.= $t;
    }
    $salt= substr( $salt, 1);
    // encoding message length
```

-continued

```
$cypher.= chr( ord( $salt[$i %strlen( $salt)]) ^ord( $key
[$i %strlen( $key)]) ^ord( $mlb[0]));
    $i++;
    $cypher.= chr( ord( $salt[$i %strlen( $salt)]) ^ord( $key
[$i %strlen( $key)]) ^ord( $mlb[1]));
    $i++;
    // message
    for( $j=0; $j<strlen( $message); $j++){
        $t= ( ord( $salt[( $i +$j) %strlen( $salt)]) +ord( $key
[( $i +$j) %strlen( $key)])) &255;
        $t= chr( $t ^ord( $message[$j]));
        $cypher.= $t;
    }
    // add padding at end
    return $cypher.$pad;
}
function decypher( $message, $key){
    if( strlen( $message) == 0 || strlen( $key) == 0){
      return false;
    }
    $key= $_GET['k'];
    // bit stream cypher
    // salt
    $t= '';
    $dmark= chr( ord( $message[0]) ^ord( $key[0]));
    $salt= $dmark;
    $i= 1;
    while ( $t != $dmark && $i < strlen( $message)){
        $t= chr( ord( $message[$i]) ^ord( $key[$i %strlen( $key)]));
        $salt.= $t;
        $i++;
    }
    $salt= substr( $salt, 1);
    // message length
    $ml= ( ord( $salt[$i %strlen( $salt)]) ^ord( $key[( $i) %strlen
( $key)]) ^ord( $message[$i])) *256;
    $i++;
    $ml= ( ord( $salt[( $i) %strlen( $salt)]) ^ord( $key[( $i) %strlen
( $key)]) ^ord( $message[$i]))+$ml;
    $i++;
    // message
    $ml= $ml +$i;
    $decypher= '';
    for( ; $i<$ml; $i++){
        $t= ( ord( $salt[$i %strlen( $salt)]) +ord( $key
[( $i) %strlen( $key)])) &255;
        $t= chr( $t ^ord( $message[$i]));
        $decypher.= $t;
    }
    return $decypher;
}
```

The following are a listing of SEAS terms:

Data: Represented as American Standard Code for Information Interchange (ASCII) encoded binary numbers of arbitrary length. Example: Character "A" is represented as "0100 0001" and "a" is represented by "0110 0001".

Root Key: A set of data of arbitrary length which is used as a symmetric key to encrypt plaintext. It is generated with a User Password and a cryptographically secure pseudo-random number.

Refresh Key: A set of data of arbitrary length which is used as a symmetric key to encrypt newly generated keys. Note: The Root Key is used a single time to replace expired keys.

Mature Key: A set of data derived from the Root Key and Root Key salt. It is used to encrypt data.

Symmetric Key: A set of data of arbitrary length which is used to encrypt and decrypt data.

Encryption Key: A set of data of arbitrary length which is used to encrypt data.

Key Hopping: Method of using the Refresh Key to replace expired Root and Refresh keys with freshly generated keys.

Plain Text: Message to be encrypted

Padding: A set of random data of random length which is used to obscure the length of the data.

Plain Text Salt: A dynamic set of data the same length as the root key. This Salt is used to modify the root key to derive the mature keys.

Root Key Salt: A set of data deterministically derived from the root key and is the same length as the root key.

Encrypted Salt: A set of data derived from the plaintext salt and mature key.

Cypher Text: A set of data consisting of encrypted salt, encrypted length of plain text, encrypted plain text, encrypted verification & padding.

Verification: A method of assuring the cypher text has been transferred to the receiver unaltered.

Authentication: A method of assuring the message was encrypted using the root key.

One-Way Hash: A mathematical function that assures derived values from any given number of sets, reveals nothing about any individual values within those sets.

Entropy Sourced Random Number:

Cryptographically secure: ****

Pseudo-random number: ****

User Password: ****

Pi Cypher: An encryption method to obscure a plain text message using the random qualities of Pi.

PI Cypher

Information can be securely transmitted over questionable or known unsecure international networks without fear of discovery of the message. Currently approved encryption algorithms have known side channel vulnerabilities. Exploitation of the mathematically transcendent superior random qualities of pi.

A. The present invention incorporates an encryption key hopping solution

I. Can have ANY timed hopping interval.

II. Keys can change as frequently as needed.

The present invention has incorporated the following features:

Implementable in hardware to allow one machine cycle per encrypted byte.

Each Key Hop is not connected in a chain of keys. Discovering a freshly generated key requires the same efforts used to discover any previous key. The Refresh key is used a single time in order to replace expired keys and is never used again.

The salt is dynamic and never stored. Contrary to common practice, each message under the Pi Cypher methodology, fresh salt is used once and never used again.

The mature Key does not reveal the root key or salt through the use of a one-way hash.

Random Number.

Cryptography exploits random numbers to obscure plaintext data. The quality of the random number is paramount to the security of the data. Nefarious actors use patterns in the random number to reveal the plaintext data. The six graphs (FIGS. 5A-5F) illustrates how patterns found in large numbers can appear obvious. Random numbers used in cryptography are very large. The numbers depicted graphically in FIGS. 5A-5F exceed 150,000 digits, with each pixel being assigned a different color corresponding to a digit of the number. While the colors are not shown in the graphical representation of FIGS. 5A-5F, the differing shades and the patterns that result are shown to illustrate what can be better seen in color, which is the patterns that can exist in certain methods of numeric generations. Also, some show no pattern and are illustrative of the randomness of the numeric string of digits.

Figure 5A:
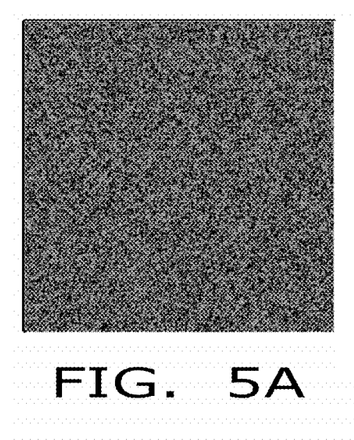
FIG. 5A is a graphical representation of the number Pi.
Figure 5B:
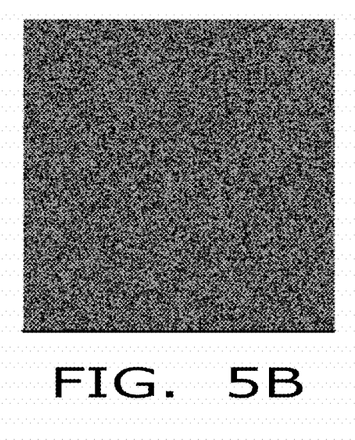
FIG. 5B is a graphical representation of a Pi Cypher random number generated by the present invention.
Figure 5C:
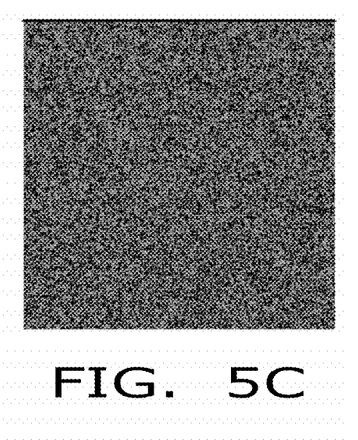
FIG. 5C is a graphical representation of another Pi Cypher random number generated by the present invention.

FIG. 5A depicts the natural constant pi. It is a transcendental number. No sequence of values within pi ever repeat. The next two, FIGS. 5B and 5C are random numbers that have been filtered through pi using Applicant's piCypher algorithm of the present invention. The perfect random quality of pi is transferred to the random numbers that were derived from otherwise sufficient sources of entropy.

Figure 5D:
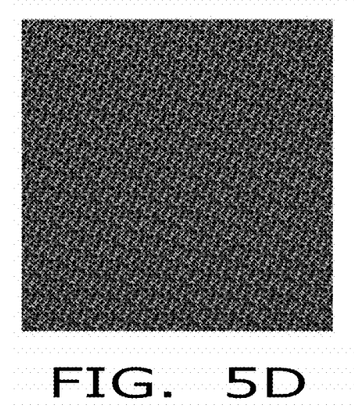
FIG. 5D is a graphical representation of a Rational Number.
Figure 5E:
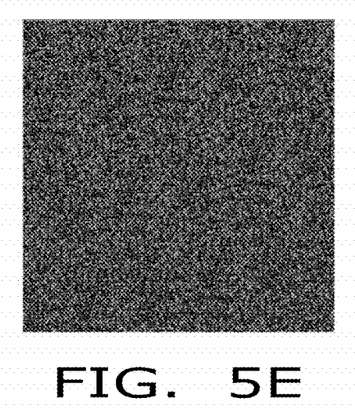
FIG. 5E is a graphical representation of a Modulated Rational Number.
Figure 5F:
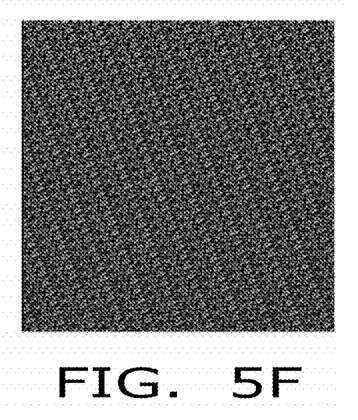
FIG. 5F is a graphical representation of a Large Denominator Rational Number.

The graphs of FIGS. 5D-5F, in the bottom row are of very low quality random numbers. Two of them (FIGS. 5D and 5F) are trivial examples of such poor quality that they would never be used in any cryptographic scheme. The middle graph (FIG. 5E) depicts an otherwise secure random number that was exposed to the sort of mathematical modulation that often creeps into computational systems of the prior art. The number looks very random, but on closer examination, we can see subtle patterns emerge.

Summary of the Visual Representations shown in FIGS. 5A-5F:
FIG. 5A—Top Left: Pi
FIG. 5B Top Middle: Pi Cypher random number example 1
FIG. 5C Top Middle: Pi Cypher random number example 2
FIG. 5D Rational Number
FIG. 5E Modulated Rational Number
FIG. 5F Large Denominator Rational Number Operational Steps: SEND MESSAGE
1. Generate Root Key w/User Password and a cryptographically secure pseudo-random number.
2. Generate fresh random plain text salt
  a. Create a binary array representation of Pi.
  b. Generate cryptographically secure pseudo-random number using an entropy source.
  c. Use the first 8 bits of random number to 'point' to a position within the Pi array and record the next 8 bits of the Pi array value into the salt.
    i. These first 8 bits of data are saved and will be used as a marker to identify the end-of-salt during decryption.
  d. Use the next 8 bits of the random number plus the value just recorded to add to the current position within the Pi array and append the next 8 bits of the Pi array onto the salt.
    i. Exception: A comparison is made to determine if the current 8 bits match the end-of-salt marker. If it matches, the current value is discarded and not appended.
  e. "d" is repeated until the required length is achieved based on the message length.
  f. Append the end-of-salt marker as the last value of the salt.
    i. Note: making the first and the last 8 bits uniquely identifiable.
3. Compile data set to be encrypted
  a. Add encoded length of message to the data set
    i. This is the length of the plain text message only expressed in base 128, most significant byte first
      1. In base 128 the most significant bit of each byte is 0. In order to signal the end of the length encoding, the most significant bit of the last byte, which is the least significant byte, is set to 1.
      2. Example 1: A 935,173-byte plain text message is represented as 0011 1001|0000 1010|0000 0101
        When the most significant bit of the last byte is changed to a '1', the end of the length encoding is known. Once changed, the length is represented as 0011 1001|0000 1010|1000 0101
      3. Example 2: A 76-byte plain text message is represented as 0100 1100
        When bit is changed the length is represented as 1100 1100
      4. *See pseudocode*
  b. Add plain text message to data set
  c. Add verification sequence to data set
    i. Note: The verification data is a specific portion of the plain text salt to be compared to assure that the message was received unaltered. It is important to understand that the encrypted salt and encrypted message with verification are encrypted is different steps via the mature key process.
    ii. Example: An 8-bit verification provides a 1 in 256 probability that the message could have been altered but a 24-bit verification provides a 1 in >16 million probability that the message received has been unaltered.
4. Encrypt
  a. This core function is described fully in in ENCRYPT section
5. Add padding
6. Transmit Cypher Text Operational Steps: ENCRYPT
In addition to obscuring a plain text message, the Pi Cypher encryption achieves additional objectives such as new salt for each message and encrypting the verification and authentication data. The process uses two sequences of the mature keys to transmit the salt encrypted and further obscuring all additional data.
1. The encryption method begins with the root key, fresh salt and compiled data set (encoded length, plain text message and the verification sequence) to be encrypted.
2. Creation of the of the Root key salt using the Pi array and Root key.
  a. Sum the Root key to 'point' to a position within the Pi array and record the next 8 bits of Pi array value into root key salt.
  b. Add the next 8 bits of random number plus value just recorded with a mask of 4095 via a logical "AND" to add to current position within the Pi array and append the next 8 bits of the Pi array onto the salt.
    i. Note: This index is saved as a starting point while generating each of the mature keys.
  c. "b" is repeated until the required length is achieved based on the root key length.
3. Create Encrypted Salt Cyphertext
  a. Each byte of the mature key and the cypher text is encrypted simultaneously through a complex but efficient procedure. A synopsis follows:
    i. A series of arithmetic operations, using the Root key, root key salt, previous mature key index, and the plaintext salt index, a value from the Pi array is added to the mature key.
      1. Note: This is the 1st mature key.
    ii. That new Mature Key value from the Pi Array is XOR with the next indexed byte of the plaintext salt creating the cypher text byte-by-byte.
    iii. This process is repeated until the last index value of the plain text salt.

4. Create encrypted cyphertext (length, plaintext message and verification)
   a. Each byte of the mature key and the cypher text is encrypted simultaneously through a complex but efficient procedure. A synopsis follows:
      i. A series of arithmetic operations, using the Root key, plaintext salt, previous mature key index, and the plaintext salt index, a value from the Pi array is added to the mature key.
         1. Note: This is generating a 2nd new mature key
      ii. That new Mature Key value from the Pi Array is XOR with the next indexed byte of the data set including the length, message, verification data thus increasing the cypher text byte-by-byte.
      iii. This process is repeated until the last index value of the data set.
5. *See pseudocode*

Operational Steps: DECRYPT

All the receiver needs is the Root Key and the Cypher Text. The Cypher Text contains the unique salt which is encrypted. Because the salt was generated randomly, it is impossible to derive the Mature Key, let alone the Root Key, from analysis of multiple messages containing the same plaintext message.
1. Decipher the plaintext salt from the cypher text using the root key in the same manner as the encryption method.
   a. Note: Since the length of the plaintext salt is unknown to the receiver, the end-of-salt marker is used to demark the end of the plain text salt.
2. Decipher the message length, from the cyphertext in the same manner as the encryption method, using the deciphered plaintext salt, to convey the length of the plaintext message.
3. Decipher the plaintext message from the cyphertext in the same manner as the encryption method.
4. Decipher the verification data from the cyphertext in the same manner as the encryption method to verify, within quantifiable le certainty, that the message and salt were unaltered.
5. Any additional cyphertext bytes are padding to be discarded.

Operational Steps: KEY HOPPING—Industry standard practice often changes the security key with a new randomly generated key by encrypting the new key with the key currently in use. Decrypting that key reveals the new key to only those who currently have the current key. This poses two problems. What if a device falls out of synch by missing the key change. There is no secure way to restore the device. Also, the security of the new key is compromised by the fact that it was encrypted with a key that was already used to encrypt a great deal of data. This leaks information about the key. If a nefarious actor did find any key in this chain of keys, he can decrypt the next key change as well.

In the present invention there are two keys instead of just one, this makes the first key set, which can be passed either by the Handshake method above or by some asymmetric encryption such as RSA or Diffie-Hellman. Communication encryption/decryption proceeds on the first of these two keys until one of the STMs 18, 20, 22, 24, 26, 28 calls to refresh keys. At which point the two new keys are generated randomly forming the second key set, which is encrypted using the second key of the first key set. Once decrypted by the other party, both keys are replaced and communication continues using the first key of each successive key set.

This provides the huge advantage of never using the second key in the key set except to encrypt the next key set. Since a key set consists of random characters, they cannot reveal anything about the second key or the new key set. Even if a nefarious actor were to discover the keys used to transmit data, he would lose his ability to decrypt the data at the next key set, since the second key was never exposed in any way.

Method of Random Number Generation

The quality of random numbers used in cryptography is paramount to the security of encrypted data. Industry standard practice develops and improves pseudo random number generators by quantifying the quality of many random numbers generated by a given pseudo random number generator. If the quality is insufficient, tweaks are applied to the generator and it is retested. The industry recognizes that the number of unique states in which industry standard pseudo random number generators can seed are in some cases as small as 2 to the power of 32. This is grossly inadequate for robust encryption.

In the present invention, during the process of developing each random number, byte by byte, the nascent number is tested for entropy and altered to introduce more entropy if necessary. As each byte of the nascent random number is generated by industry standard methods such as bit rotate, shift, XOR, and AND, the entropy of the new byte is measured by counting the number of times that byte value has already appeared in the nascent random number. If it occurs more than the number of bytes in the nascent number divided by the number of available characters for that byte, the byte value is replaced by the next available and valid value or dropped merely entirely. See pseudo code newRandomNumber( )

Proprietary Method of Symmetric Encryption using Salt and Padding

As previously mentioned, random "salt" can be used to alter a symmetric key deterministically. Random "padding" can also be added to the message. In this way, the same message encrypted with the same key appears differently every time. Industry standard practice employs salt of fixed length and padding to fill messages to a predetermined length. The padding does not need encryption and the salt must be stored in a data base. The length of salt and location of padding can leak information about the key. Also, if a nefarious actor were to cause a message known to him to be encrypted, he can infer the key, because knowledge of the salt is not secured.

The salt can be the padding. Take the padding length as the number of characters to fill the desired length of the encrypted message. Generate a random string of characters of that length minus one. Replace all occurrences of a designated demark character from the string and append the demark character at the end. Further append the message to the string. Begin to encrypt by using the key until the demark character is encountered. Then continue encrypting using the key altered by the salt. The demark character is encrypted along with everything else and becomes hidden. The length of the salt and therefore the length of the message is hidden also. The padding is the salt.

To decrypt begin by decrypting using the key only. Once the decryption reveals the demark character, continue decrypting by altering the key with the newly decrypted salt in the same way as encryption. In this way the salt is secured by the key and the key is secured by the salt. The salt is unavailable. The only place it is stored is as encrypted padding in the encrypted message. Even if a known message were encrypted, the key cannot be determined by causing a known message to be encrypted.

See Pseudo Code Cypher( )/Decipher( )

The bit length of the keys in the key sets are dynamically set by the key generation method, but it is also contemplated that the bit length of the keys may be set at an arbitrary number of bits.

Although the entire foregoing discussion of the present invention is considered to be a preferred embodiment of the present invention, it is also contemplated that the present invention can be carried out within the network members themselves without the use of modules 18, 20, 22, 24, 26, 28. The present invention may consist of a software implementation within the network members, or by a combination of hardware changes within the network members and software. It is also contemplated that virtual modules within the network members can be used to carry out the method of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A data communication encrypted system, comprising:
   a plurality of modules including a first module and a second module;
   a first network member coupled to the first module; and
   a second network member coupled to the second module, the first module and the second module being in communication with each other thereby allowing communication between the first network member and the second network member, the first module and the second module each operating with a key hopping encryption/decryption method that generates a key set change at irregular intervals of time as determined by the modules, each key set change that occurs at irregular intervals of time being one of a series of key set changes, each of the plurality of modules being configured to generate at least one of the series of key set changes independent of the remaining plurality of modules, a key set being used by the modules to encrypt/decrypt being a current key set, a key set that is generated when a key set change is called for being a new key set, each key set including a data key and a refresh key, the refresh key of the current key set being used to encrypt the new key set before the new key set is sent by the first module or the second module, the refresh key of the new key set being of arbitrary length, the system being configured to:
   append a message with at least one demark character, and padding to make a data set of a selected length, the padding being salt;
   initially encrypt the data set using the data key and the salt, until the at least one demark character is encountered; and
   encrypt the demark character and the padding using the data key, thereby creating an encrypted data set that is securely communicated from one of the modules to another of the modules.

2. The data communication encrypted system of claim 1, wherein the data key is used to decrypt the padding of the encrypted data set.

3. The data communication encrypted system of claim 1, wherein at least one of the data key and the refresh key have a dynamically determined bit length.

4. The data communication encrypted system of claim 1, wherein the refresh key of the key sets is only used to encrypt/decrypt the key sets.

5. The data communication encrypted system of claim 4, wherein the modules use the data key of the current key set to encrypt/decrypt data until one of the modules call for a generation of the new key set.

6. The data communication encrypted system of claim 1, wherein after the encrypted new key set is communicated the modules decrypt the encrypted new key set using the refresh key of the current key set and replace the current key set with the new key set.

7. The data communication encrypted system of claim 1, wherein the data keys are never used to encrypt/decrypt subsequent key sets.

8. The data communication encrypted system of claim 1, wherein either the first module or the second module generates the key set changes.

9. The data communication encrypted system of claim 1, wherein the system is additionally configured to:
   receive the data set; and
   decrypt the encrypted data set using the data key until the demark character is encountered to recover the salt.

10. The data communication encrypted system of claim 9, wherein the system continues the decrypting of the encrypted data set using the key and the salt to thereby decrypt the message.

* * * * *